R. SINCLAIR, Jr. & R. F. MAYNARD.
Feed Roller for Straw Cutters.
No. 10,238.
Patented Nov. 15, 1853.
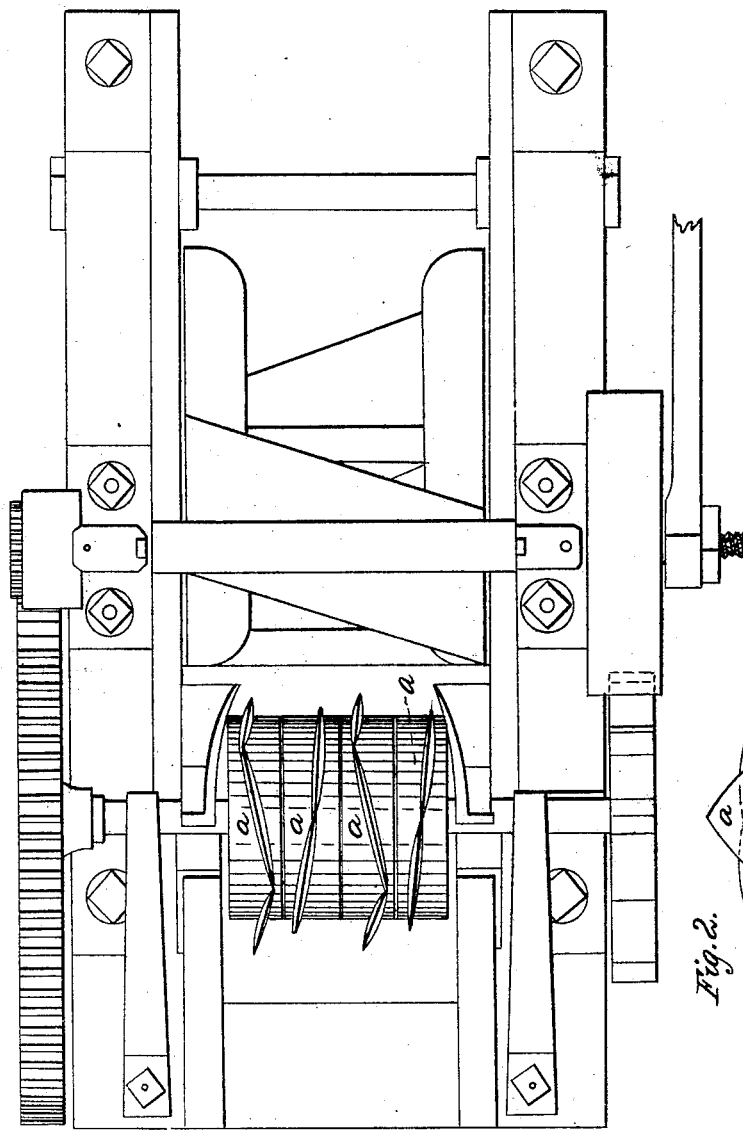
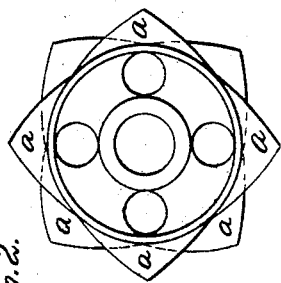

UNITED STATES PATENT OFFICE.

ROBERT SINCLAIR, JR., AND RICHARD F. MAYNARD, OF BALTIMORE, MARYLAND.

FEED-ROLLER OF STRAW-CUTTERS.

Specification of Letters Patent No. 10,238, dated November 15, 1853.

*To all whom it may concern:*

Be it known that we, ROBERT SINCLAIR, Jr., and RICHARD F. MAYNARD, both of Baltimore, Maryland, have invented a new and useful Improvement in Straw-Cutters, of which the following is a full, clear, and exact description, reference being had to the annexed drawings, in which—

Figure 1 is a plan of the improved roller; Fig. 2 a cross section of the same.

Our invention consists in the employment on the feeding roller of straw cutters alternate right and left pins so arranged as to form a double spiral or screw, for the purpose of feeding forward the straw, preventing it from crowding to the right or left of the box, and compressing it as it is passed to the knives. These pins are either of cast or wrought iron and of the form indicated in the two representations Fig. 1 and Fig. 2 letter (a) and arranged as seen clearly in Fig. 1, there being four rows (more or less may be used) and alternating so as to make right and left spirals, so that while the action of one spiral is to throw the straw to one side of the box the next spiral counteracts this action. The pins are pyramidal or tapering, and this form is essential to the proper action of the double spiral and it will be observed that these pins constituting the spiral do not drag the straw forward but propel it as it were, and hence their sharp edges, which must enter between the straws and propel them obliquely forward. The double screws as before said, carry the straw straight forward by their combined action, and thus keep it from being crowded to the right or left. Other parts of the straw cutter are similar to those in common use. The fins may be cast whole with the cylinder of the feeder or attached to a wooden or metallic cylinder in any of the usual methods of attachment.

What we claim as our invention and improvement in the feeder for straw cutters, is—

The employment thereon of alternate right and left fins so arranged as to form a double spiral or screw, said fins being formed substantially as set forth and operating together so as to prevent the straw from crowding to the right or left, and to compress the straw laterally as it is passed to the knives, and constituting altogether what we denominate the double screw propeller for straw cutters.

ROBERT SINCLAIR, JR.
R. F. MAYNARD.

Witnesses:
JOHN ZELL,
EDWARD M. WISE.